United States Patent [19]
Anselm et al.

[11] Patent Number: 5,522,441
[45] Date of Patent: Jun. 4, 1996

[54] WOOD LATHE TOOLING

[75] Inventors: Kenneth R. Anselm, LaCenter, Ky.;
Gordon Footit, Grasmere, United Kingdom; Roger Bowness; Stephen J. Perry, both of Windermere, United Kingdom; William D. Fulton, Puddington, United Kingdom

[73] Assignee: Western Cutterheads, Inc., La Center, Ky.

[21] Appl. No.: 288,317

[22] Filed: Aug. 10, 1994

[51] Int. Cl.$^6$ ............................ B27C 7/00; B27G 13/12; F16D 1/06
[52] U.S. Cl. ............................ 142/41; 83/665; 144/218; 144/230; 403/15; 407/41; 279/2.08; 279/4.03
[58] Field of Search .................... 142/40, 41, 1; 83/665, 698.41; 144/218, 230, 221, 224–227; 403/15; 279/2.08, 4.03; 407/21, 33, 36, 37, 40, 41

[56] References Cited

U.S. PATENT DOCUMENTS

| | | | |
|---|---|---|---|
| 1,736,421 | 11/1929 | Turcott | 142/40 |
| 2,490,516 | 12/1949 | Furlin | 142/41 |
| 3,917,422 | 11/1975 | Betzler | 144/218 |
| 4,429,726 | 2/1984 | Betzler | 144/230 |

*Primary Examiner*—Steven C. Bishop
*Attorney, Agent, or Firm*—Cushman Darby & Cushman

[57] ABSTRACT

A cutterhead, particularly for wood lathe tooling includes one or more sleeves each of which has an inner hydraulically operated circumferential gripper for securement to a rotatable arbor, and an outer, independently hydraulically operated circumferential gripper for securement to a cylinder. The outer peripheral surface of the cylinder is provided with longitudinal dovetail ribs. Knife carriers and space-filling limiters slide axially onto these ribs and are locked in place by set screws. Each carrier has a slot for radially receiving a knife to be gripped between a wedge and a corrugated keeper. The keeper and carrier slot are keyed together to provide for radial adjustment of the knife. A threaded pin restrains slot spreading and radially retains the wedge and keeper. Wedge action prevents radial throwing of elements should someone neglect to secure the carriers or limiters, or neglect to elevate the wedges. Knives are slotted for easy removal, and corrugated to match the keepers to facilitate knife height adjustment. All but inner and outer rings of the sleeves, the threaded pins and keepers are made of aluminum. The knives are made of steel.

23 Claims, 17 Drawing Sheets

WOOD LATHE TOOLING

BACKGROUND OF THE INVENTION

For turning rotationally symmetrical elements such as wooden spindles or balustrades, a workpiece mounted in chucks is spun and a knife or set of knives is urged towards the work in a controlled manner, causing wood located outside the desired profile to be chipped away. In high speed work, the knives themselves are not held manually, but are themselves mounted on a rotary shaft which is urged transversely relatively towards the workpiece while spinning. (Actually, the spinning workpiece may be moved transversely towards the set of rotating knives.) In the language of the trade, the rotating shaft on which the knives are mounted is termed an arbor, and the set of knives, including the structure by means of which they are mounted to the arbor, is termed a cutterhead.

Although various features of cutterheads have been improved through the years, some detrimental characteristics have remained wanting improvement. Among these are the difficulty of easily and reliably mounting a cutterhead on an arbor so that it is accurately coaxial, easily and reliably mounting knife carriers on the cylinder of the cutterhead, preventing elements from being radially thrown out from the rotating cutterhead should an operator or set-up person neglect to tighten everything that is supposed to be tightened before the arbor is rotated, a high noise level due to air turbulence about the rotating cutterhead, danger of a breaking workpiece causing damage to the cutterhead or to the operator due to penetrating and then being flung from a radial pocket between knives or holders in the outer peripheral surface of the cutterhead, and the perceived need to provide strength through use of massive parts, resulting in weighty cutterheads.

SUMMARY OF THE INVENTION

A cutterhead, particularly for wood lathe tooling, includes one or more sleeves each of which has an inner hydraulically operated circumferential gripper for securement to a rotatable arbor, and an outer, independently hydraulically operated circumferential gripper for securement to a cylinder. The outer peripheral surface of the cylinder is provided with longitudinal dovetail ribs. Knife carriers and space-filling limiters slide axially onto these ribs and are locked in place by set screws. Each carrier has a slot for radially receiving a knife to be gripped between a wedge and a corrugated keeper. The keeper and carrier slot are keyed together to provide for radial adjustment of the knife. A threaded pin restrains slot spreading and radially retains the wedge and keeper. Wedge action prevents radial throwing of elements should someone neglect to secure the carriers or limiters, or neglect to elevate the wedges. Knives are slotted for easy removal, and corrugated to match the keepers to facilitate knife height adjustment. All but inner and outer rings of the sleeves, the threaded pins and keepers are made of aluminum. The knives are made of steel.

The principles of the invention will be further discussed with reference to the drawings wherein preferred embodiments are shown. The specifics illustrated in the drawings are intended to exemplify, rather than limit, aspects of the invention as defined in the claims.

BRIEF DESCRIPTION OF THE DRAWINGS

In the Drawings:

FIG. 6 is a one end view of a dovetailed cylinder provided in accordance with a preferred embodiment of the present invention, the opposite end being substantially similar;

DETAILED DESCRIPTION

Figure 1:
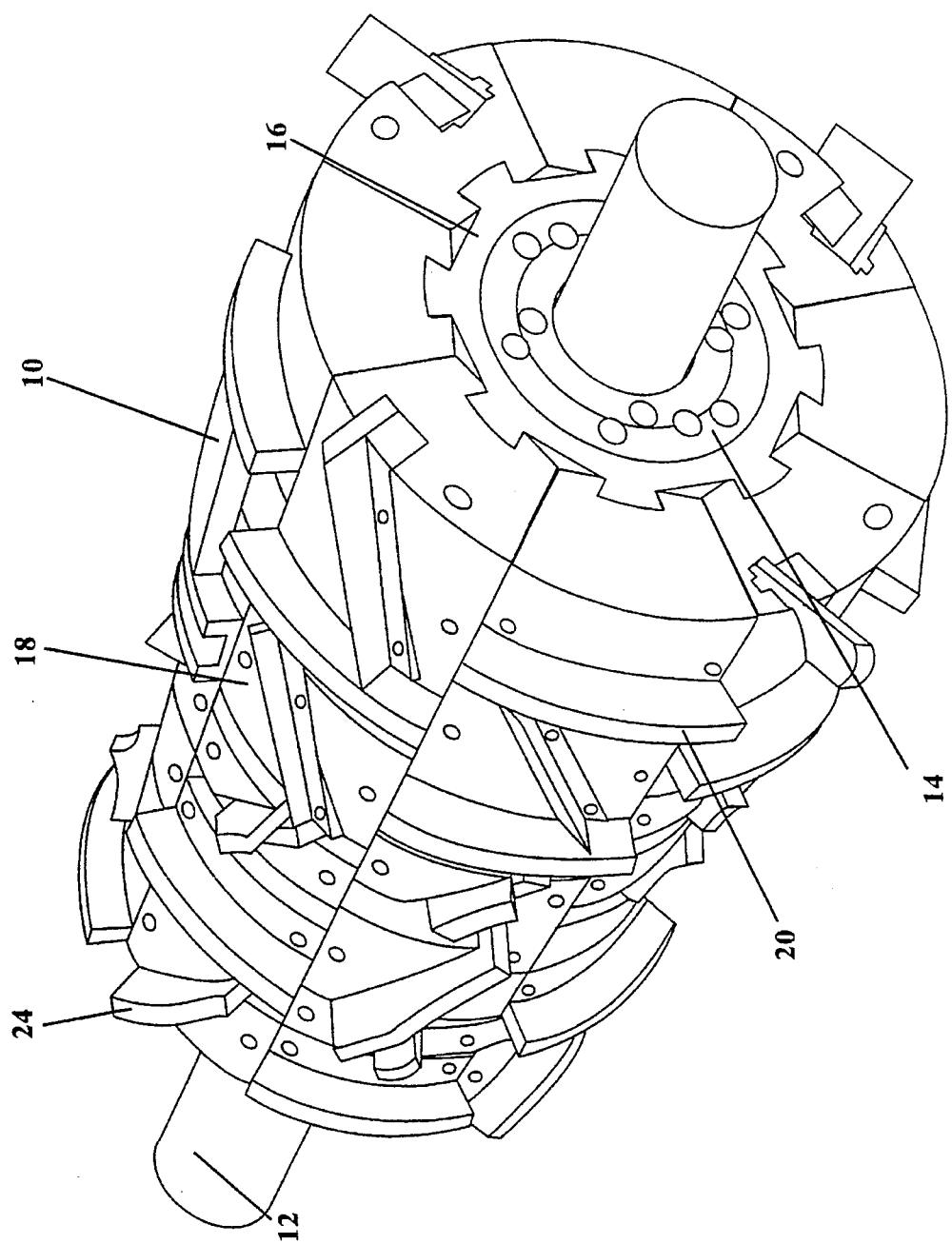
FIG. 1 is a perspective view of a cutterhead provided in accordance with a preferred embodiment of the invention, and shown mounted on an arbor (only an axially intermediate portion of which is depicted)
Figure 2:
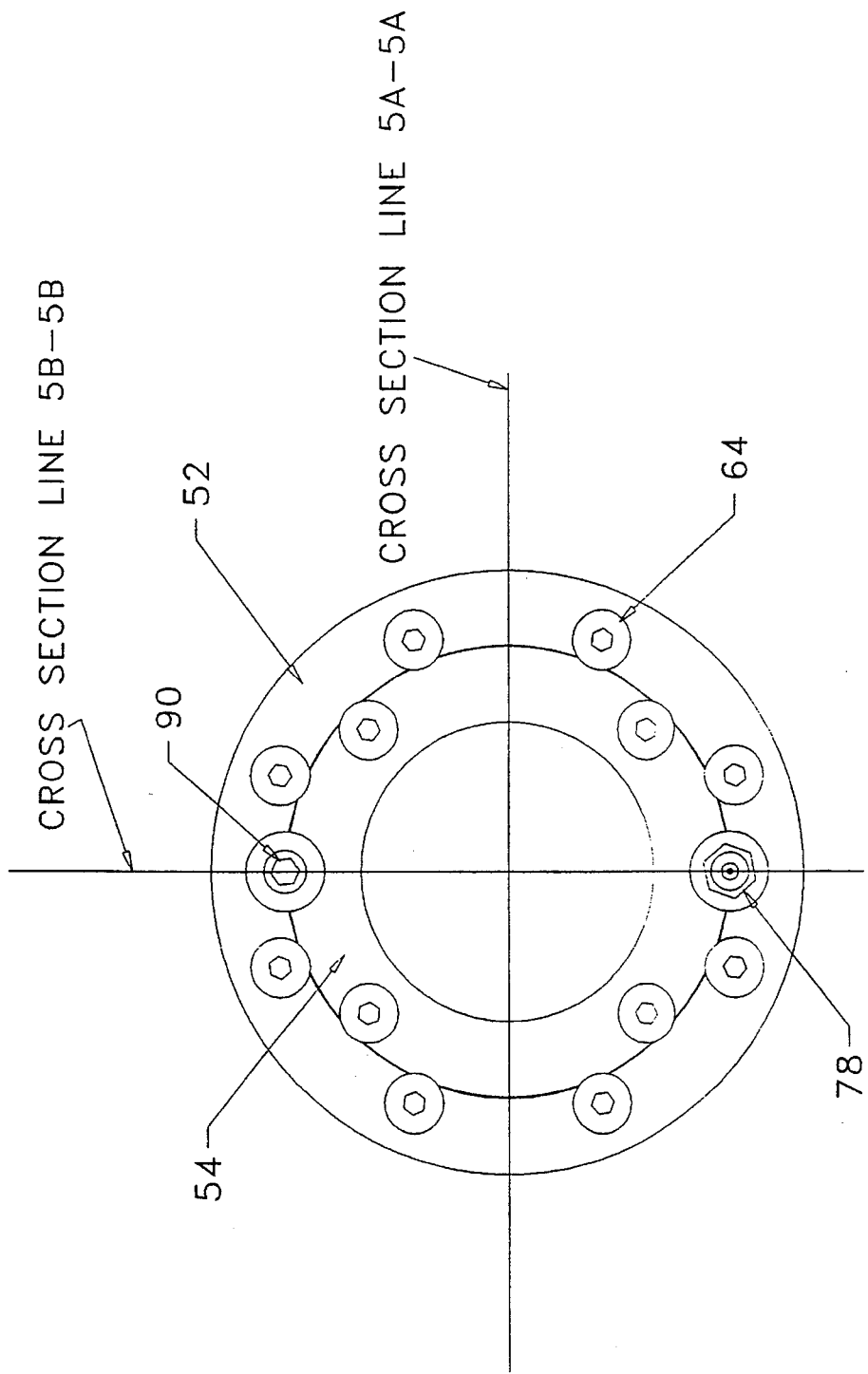
FIG. 2 is a one end view of a hydraulic locking sleeve of the cutterhead.
Figure 3:
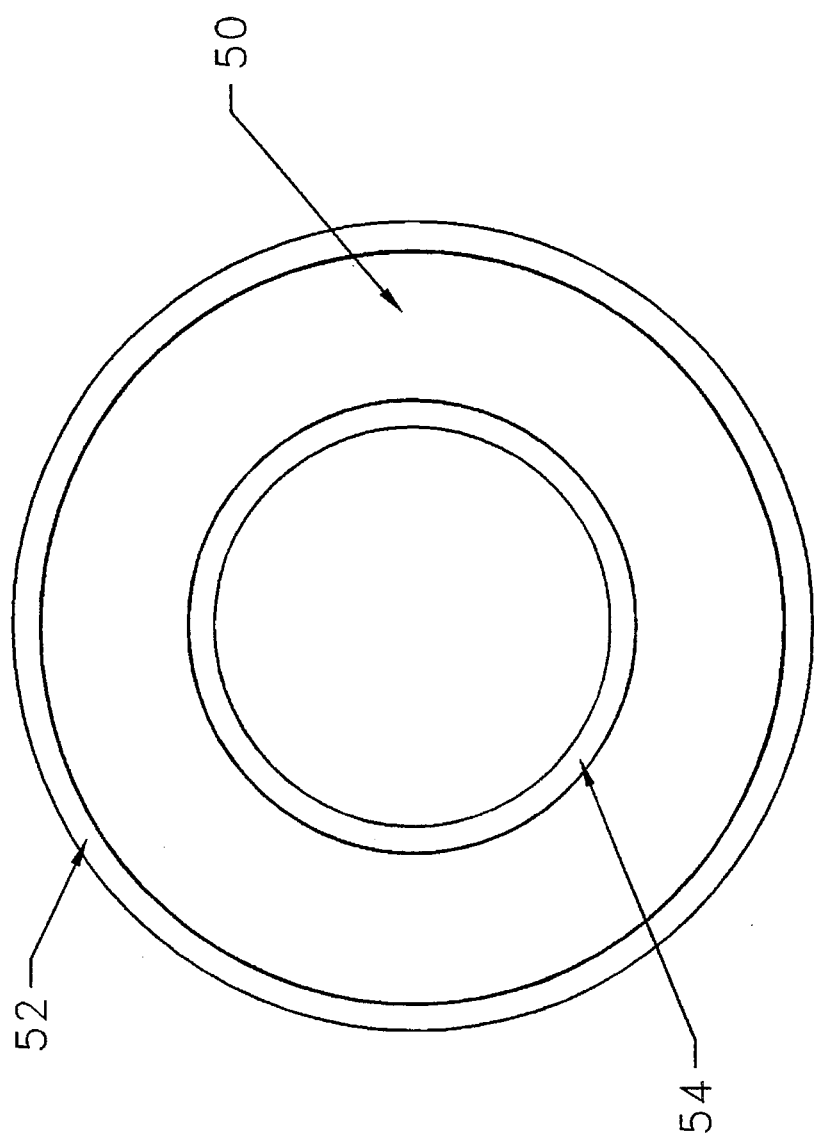
FIG. 3 is an opposite end view thereof.
Figure 4:
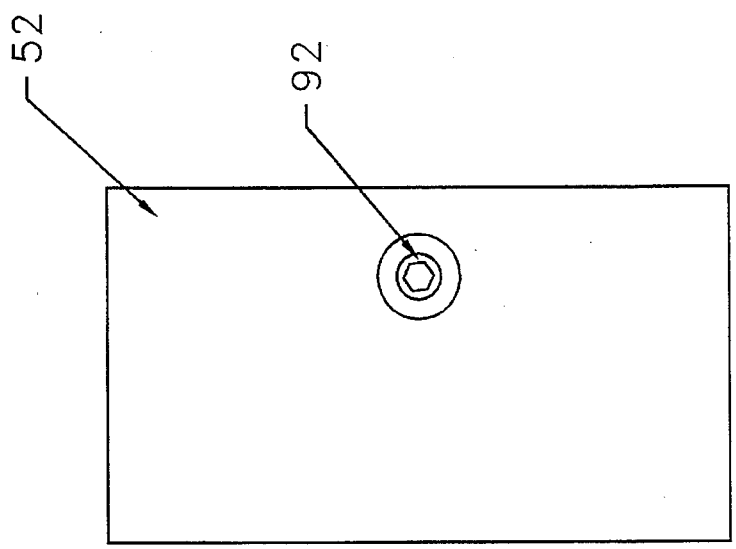
FIG. 4 is a side elevational view thereof.
Figure 5:
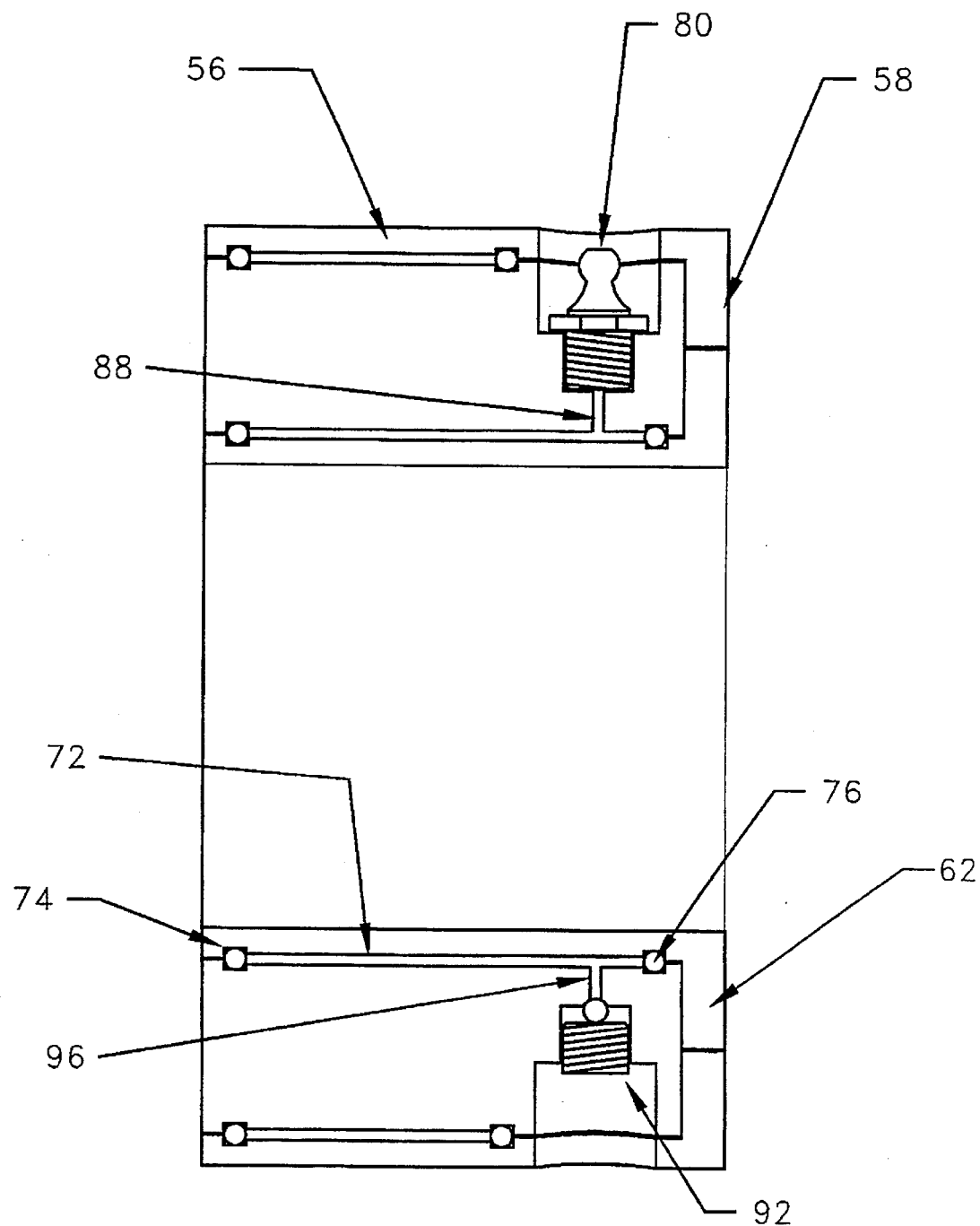
FIG. 5A is a longitudinal sectional view thereof on line 5A of FIG. 2.
FIG. 5B is a longitudinal sectional view thereof on line 5B of FIG. 2.
Figure 5:
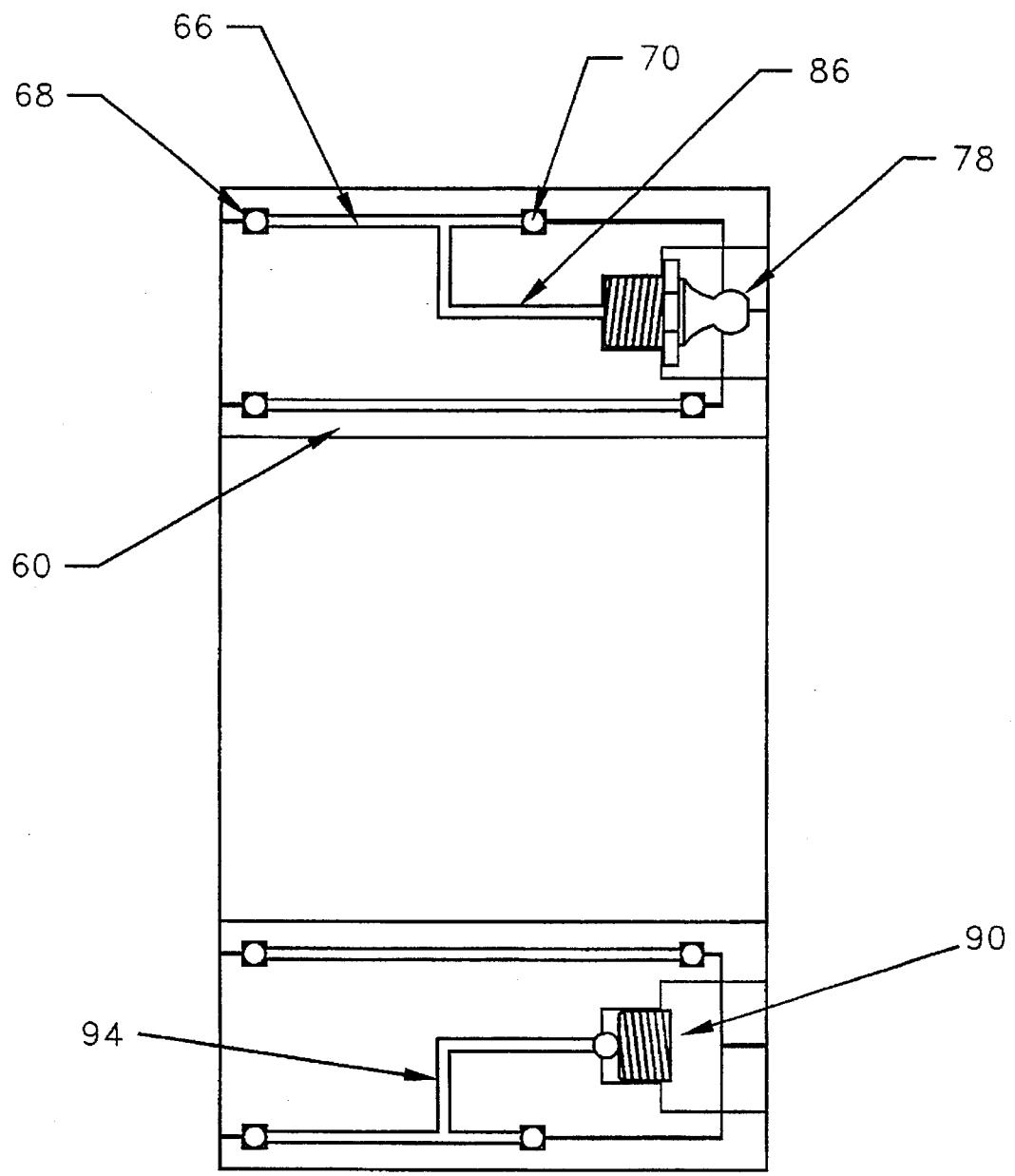
Figure 6:
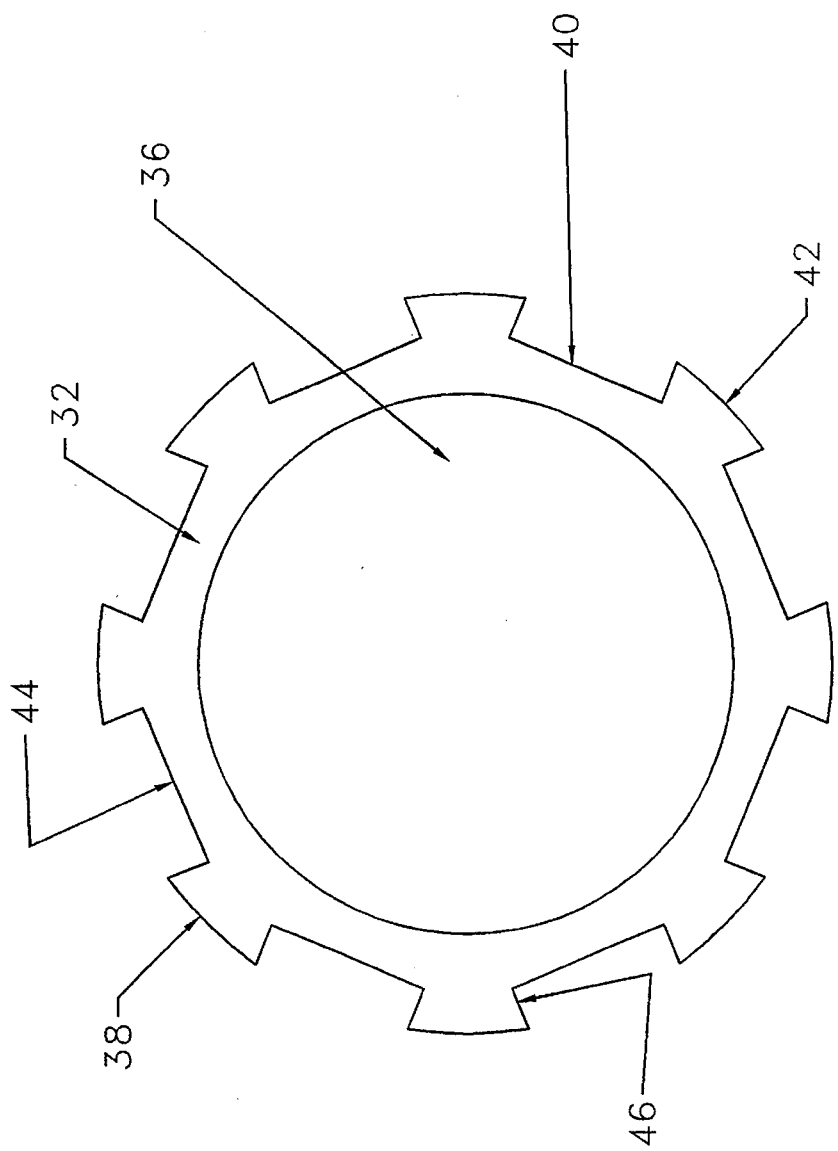
Figure 7:
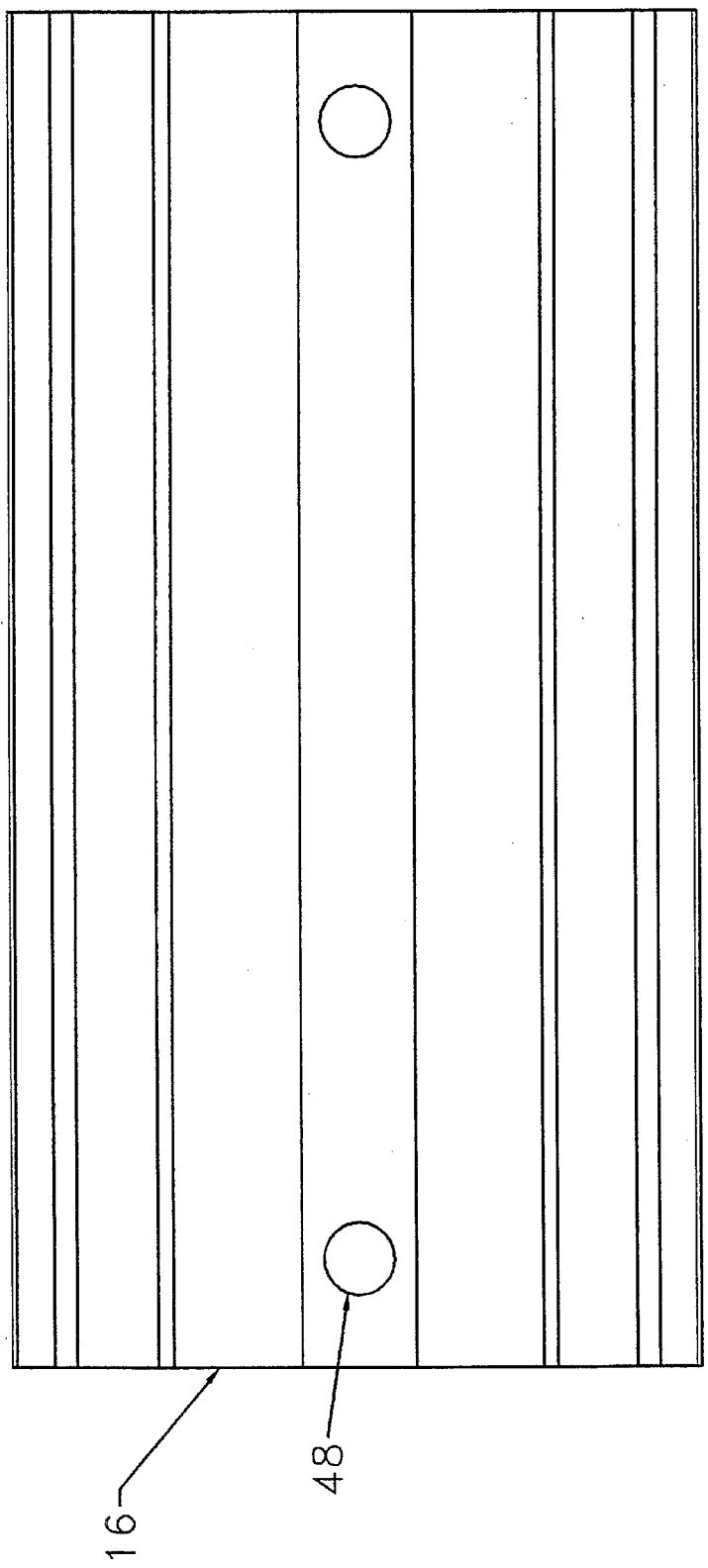
FIG. 7 is a side elevational view thereof.
Figure 8:
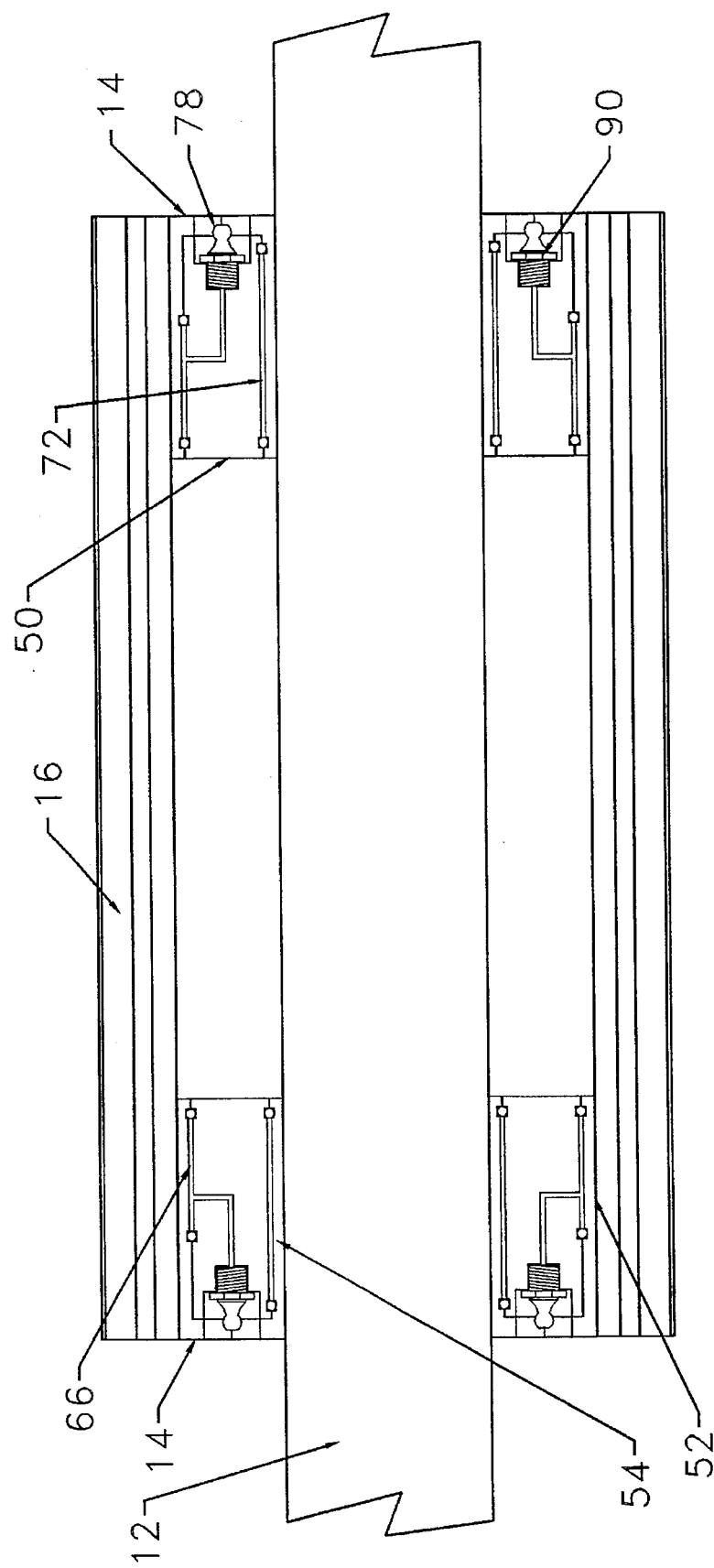
FIG. 8 is a transverse cross-sectional view of the dovetailed cylinder mounted by at least one hydraulic locking sleeve onto the arbor, the cutting plane passing through the pressurized grease-filled veins of the locking sleeve.
Figure 9:
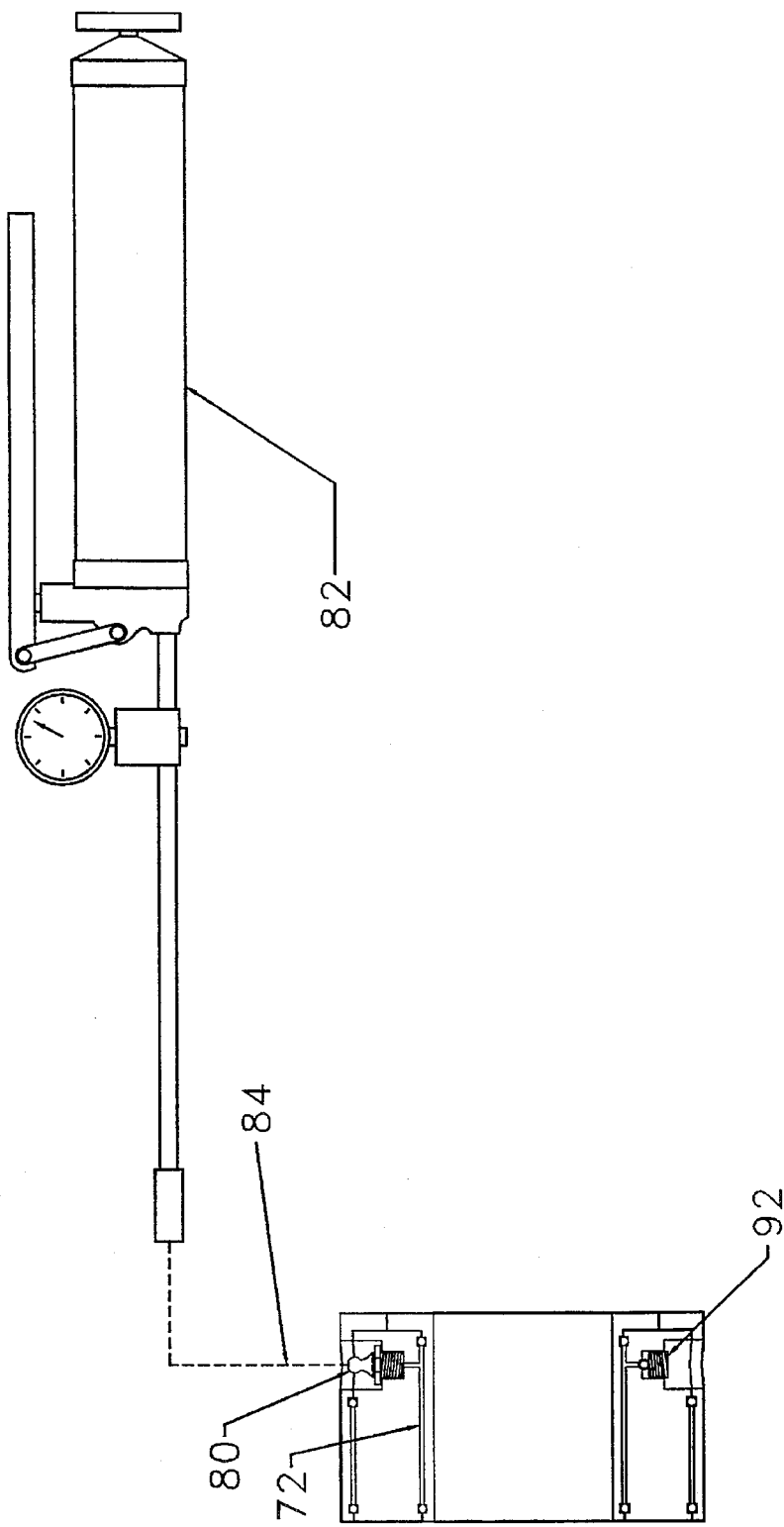
FIG. 9 is a fragmentary perspective view showing a grease gun, in use, forcing grease into the radially inner vein for radially centralizing and securing the hydraulic locking sleeve with respect to the arbor.
Figure 10:
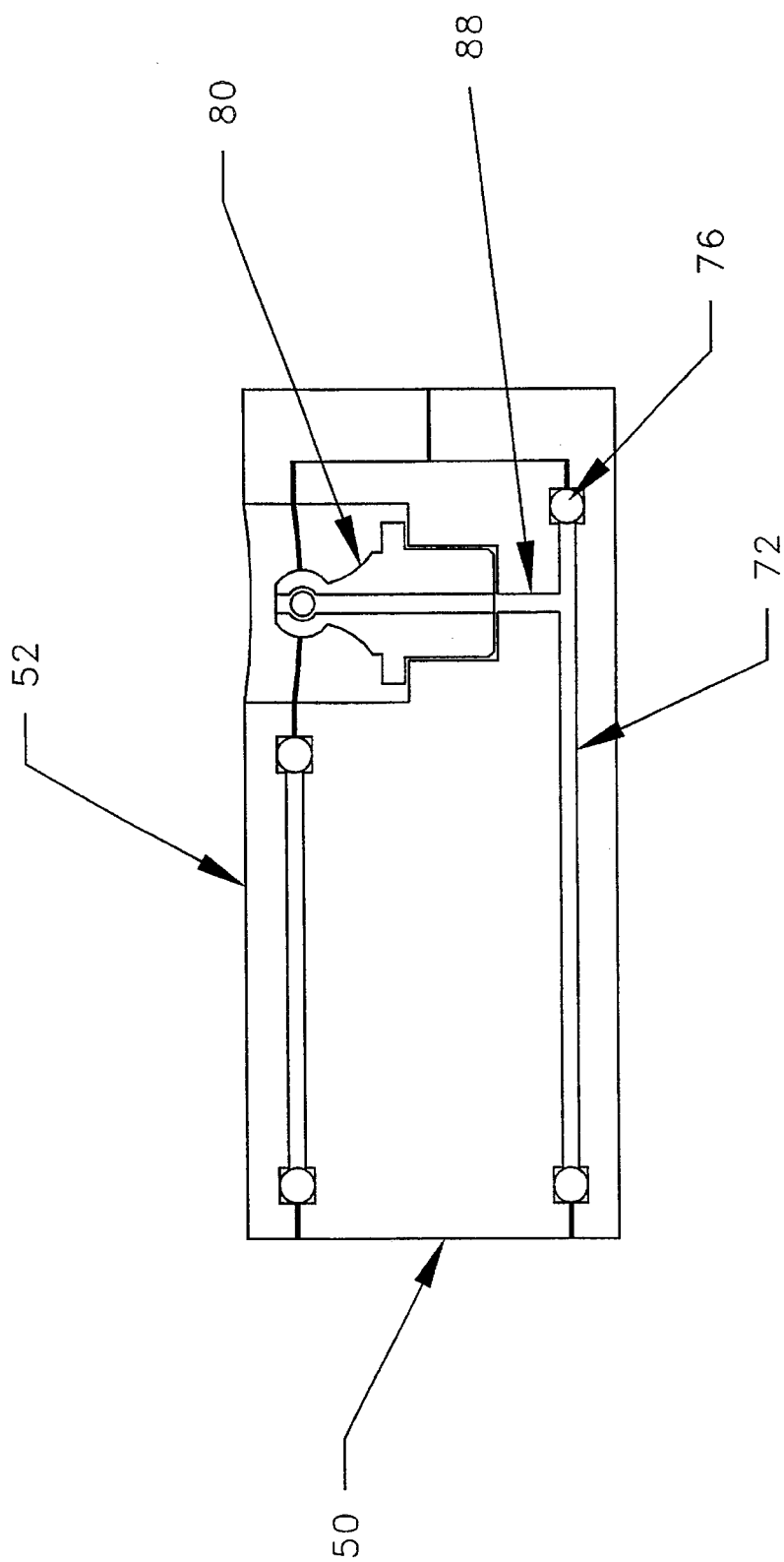
FIG. 10 is a fragmentary cross-sectional view showing the structure of one of the grease inlet fittings.
Figure 11:
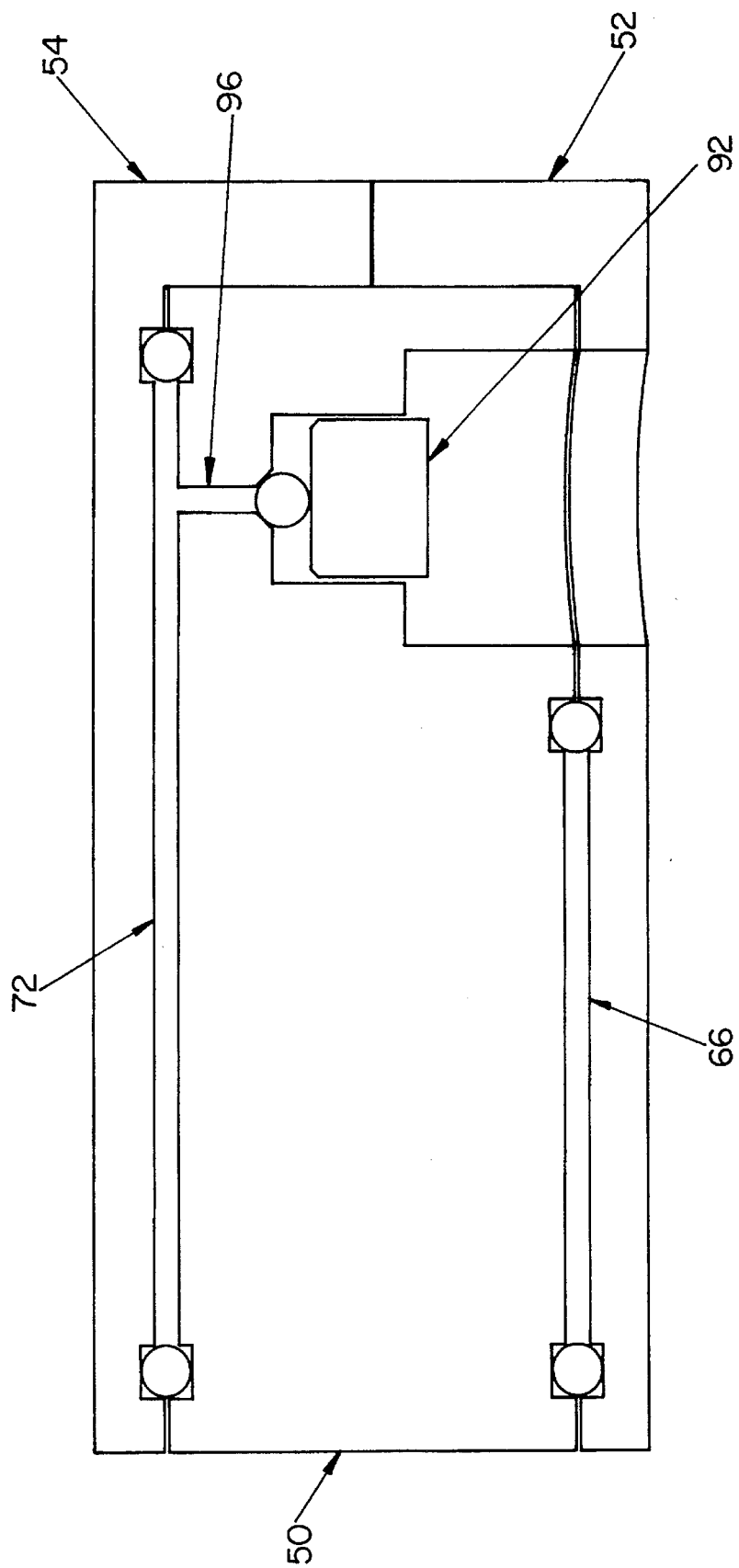
FIG. 11 is a fragmentary cross-sectional view showing the structure of one of the grease outlet valves.
Figure 12:
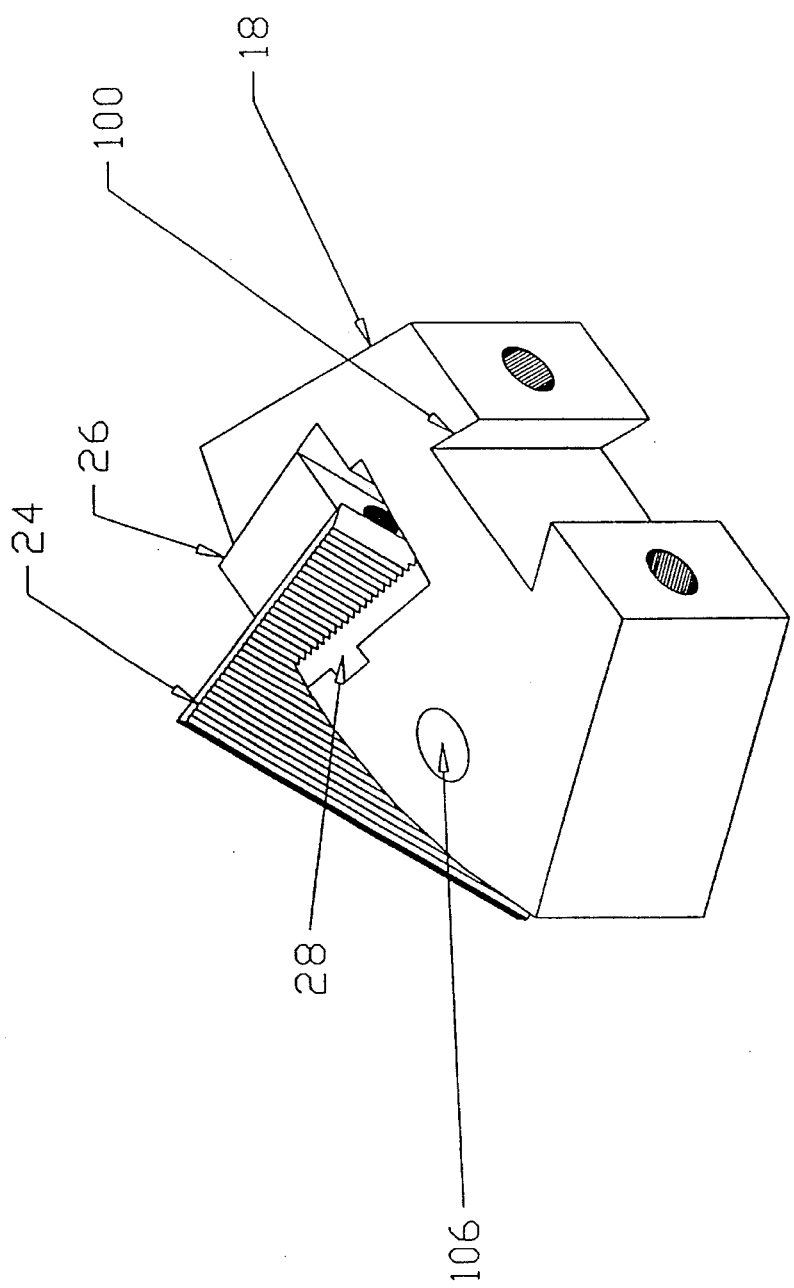
FIG. 12 is a one end elevational view of an assembled wedge, corrugated keeper, threaded pin and a knife slotted carrier.
Figure 13:
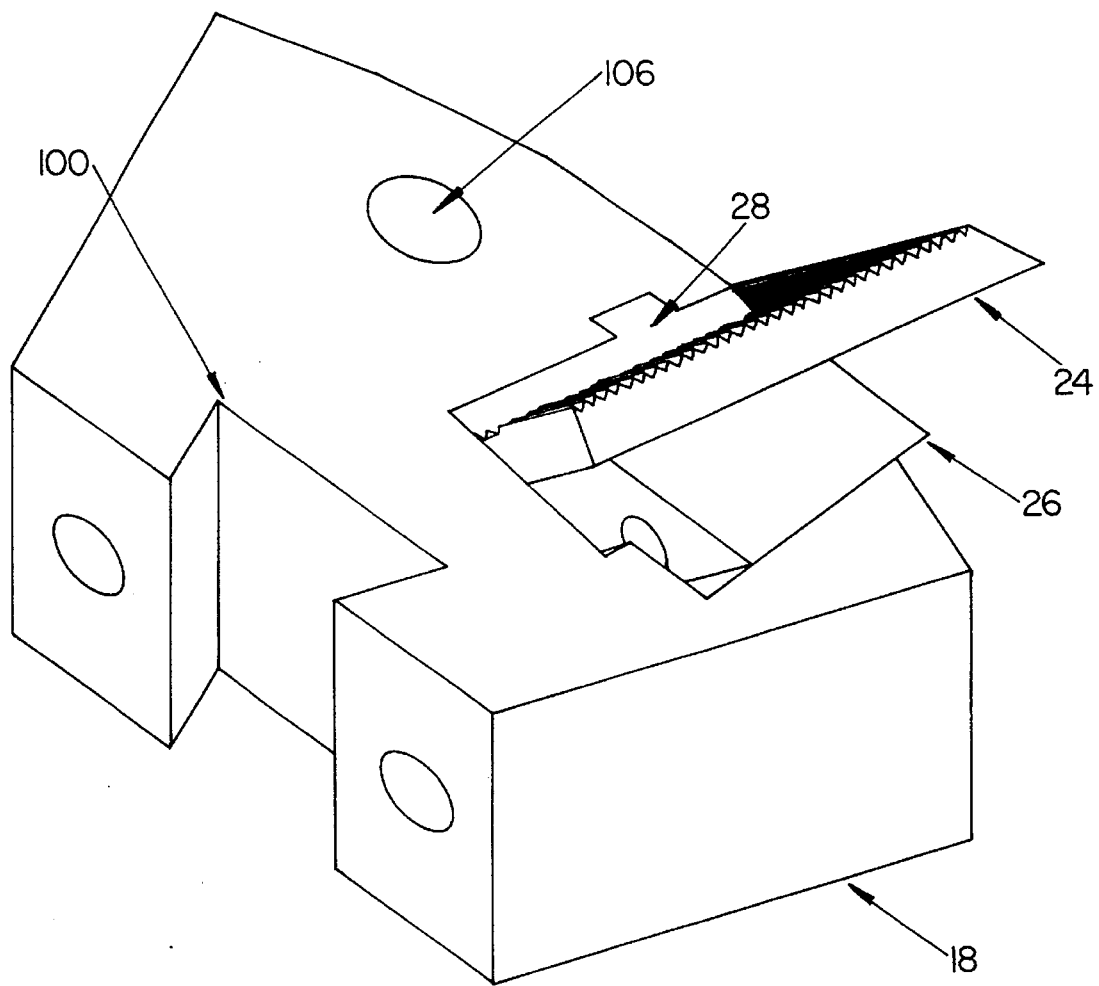
FIG. 13 is an opposite end view thereof.
Figure 14:
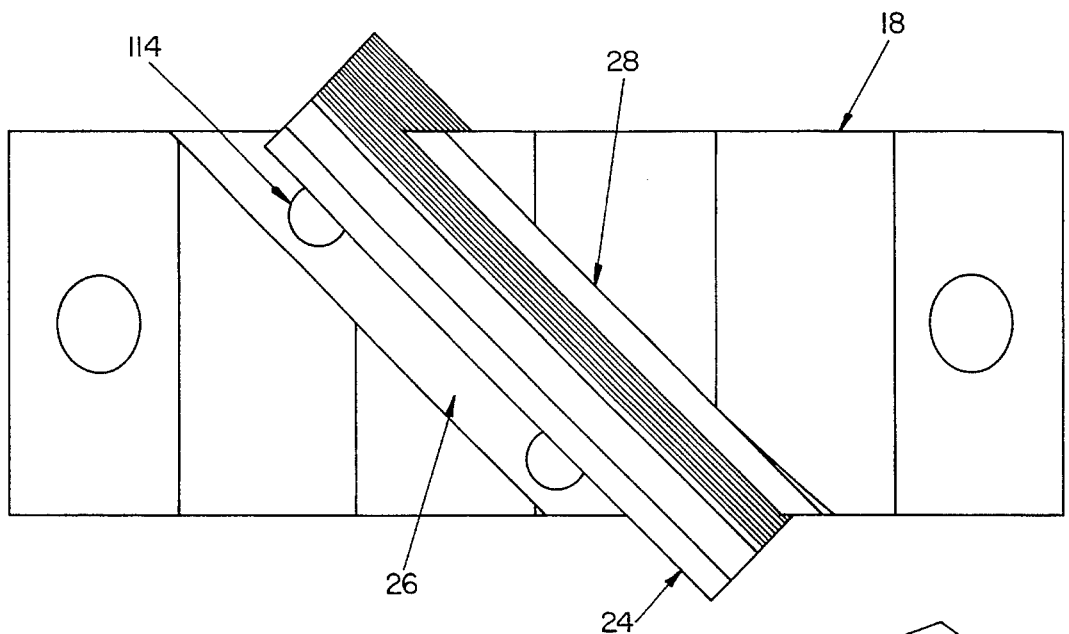
FIG. 14 is a radially outer plan view thereof.
Figure 15:
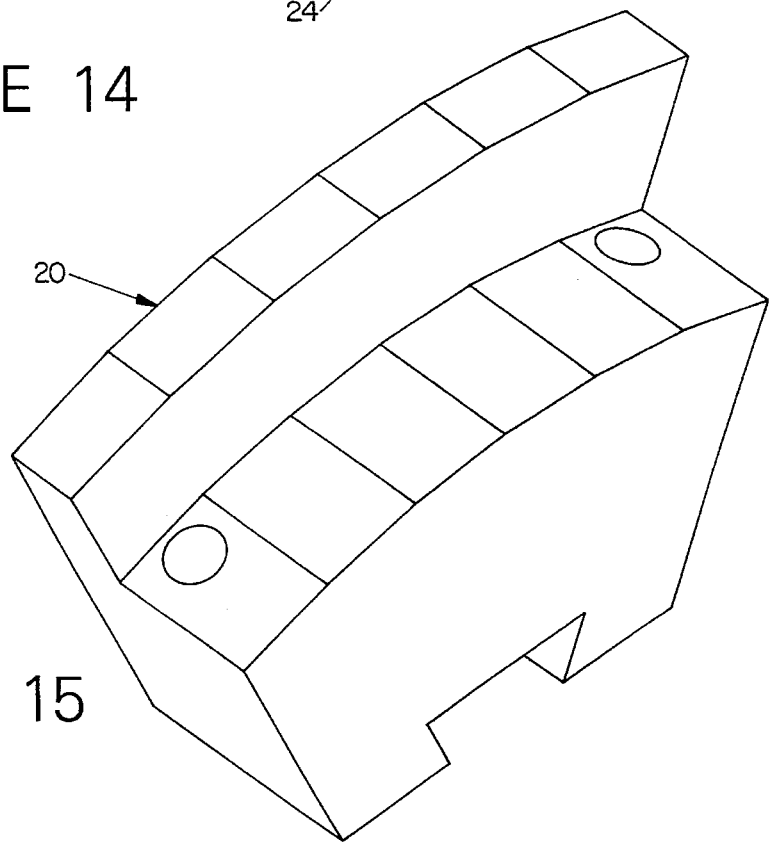
FIG. 15 is a perspective view of a limiter.

For a general orientation in regard to the parts which are about to be described in detail, please refer to FIG. 1, in which a cutterhead 10, provided in accordance with principles of the present invention, is shown mounted on a conventional externally cylindrical rotary arbor 12.

The cutterhead 10 is shown including at least one hydraulic locking sleeve 14, by means of which a dovetailed cylinder 16 is coaxially mounted on the arbor 12. (Although only one cylinder 16 is shown, an arbor in actual practice could mount two or more of them, usually abutted end-to-end (since no part of one extends past either of its ends), but possibly with some axial spacing between them. What is said herein about one such cutterhead, could be equally true of the others, or one or more cutterheads of the present invention could be used next to one or interspersed with one or more cutterheads of other design, e.g., conventional ones.)

The cylinder 16 mounts a plurality of carriers 18 and limiters (or spaces) 20, arranged in longitudinally extending rows and circumferentially extending columns.

Figure 16:
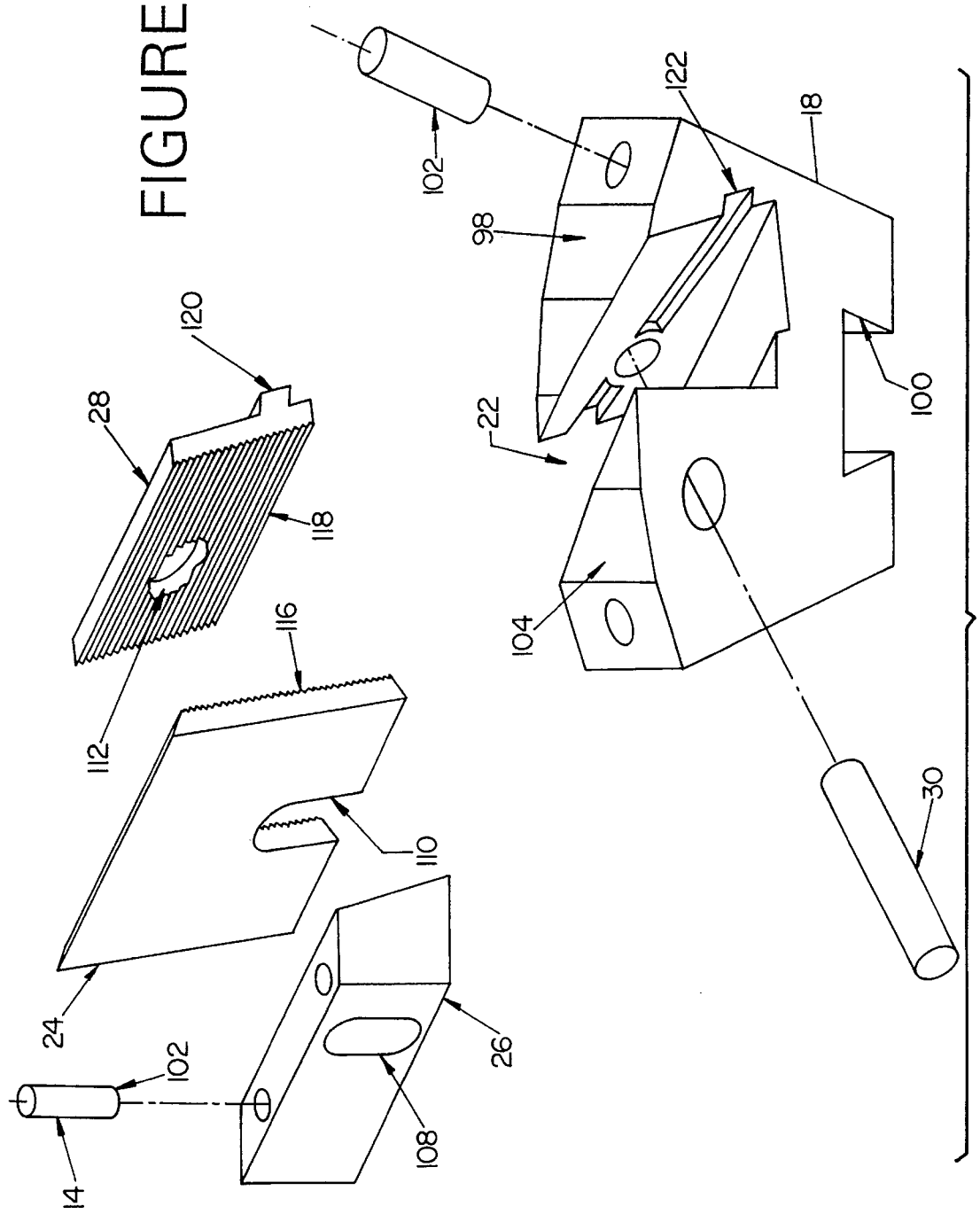
FIG. 16 is an exploded perspective view of the slotted carrier, a wedge, a corrugated keeper, a threaded pin and a knife.
Figure 17:
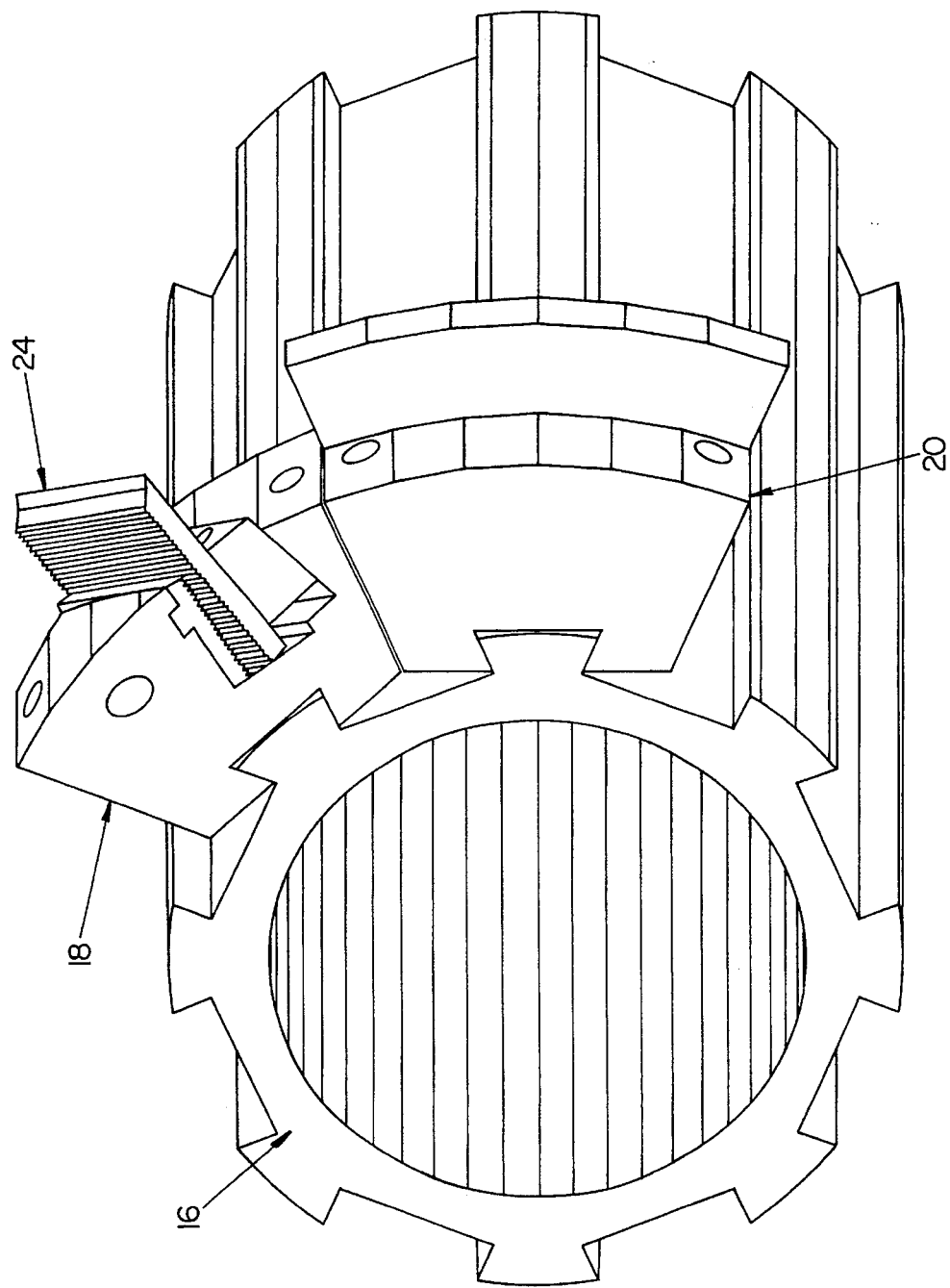
FIG. 17 is an assembled one end elevational view of the same parts as are shown in FIG. 12, mounted rotationally next to a limiter on rotationally neighboring dovetail ribs on the cylinder (the cylinder being shown only fragmentarily in this view).

Each carrier mounts in its radially outwardly opening slot 22, a knife 24 between a wedge 26 and a corrugated keeper 28. A threaded pin 30 (FIG. 16) radially retains the wedge and keeper in the slot and restrains the lobes of the carrier against spreading apart as the wedge is elevated by threading in its elevating screws (discussed below).

The arbor 12 is conventional, and provided on a conventional wood-turning lathe. It is a steel cylinder designed to be rotated in use, e.g., at 2700 RPM, about its own longitudinal axis. It is, for instance, 2.624 inches in diameter.

(Unless otherwise indicated, or evident from the context, dimensions given herein are typical and subject to scaling and variation within usually accepted limits.)

The dovetailed cylinder 16 preferably is made from extruded aluminum stock that is from 12 to 16 feet long. The stock is cut to desired lengths, the ends 32, 34 trued in a metal lathe so as to be substantially flat and substantially perpendicular to the longitudinal axis of the cylinder. A cylinder 16 can be of any desired length, e.g., 3, 4, 5, 6, 7, etc., inches in length, up to at least 14 inches in length.

Because the cylinder 16 is to be mounted on the arbor, not directly, but via one or more of the hydraulic locking cylinders 14, the coaxial bore 36 of the cylinder 16 is slightly larger, e.g., from 2 to 3 thousandths up to less than 5 thousandths of an inch larger in diameter than the free outer diameter of the hydraulic locking sleeve or sleeves 14 which are to be used therewith. (By "free" it is meant when not forcibly expanded by hydraulic pressurization.)

It is preferred that if a cylinder 16 is axially relatively short, e.g., 3, 4, or 5 inches long, that it be designed to be locked onto the arbor 12 using one hydraulic locking sleeve 14, of corresponding length, but if it is longer, to be locked onto the arbor 12 using two sleeves 14, e.g., two 3-inch long sleeves 14 for a 6-inch long cylinder, or two 3, 4 or 5-inch long sleeves for a 14-inch long cylinder. Where two sleeves are used, it is preferred that they be located in the cylinder bore 36 with their outer ends flush with the respective ends 32, 34 of the cylinder.

A typical dimension for the bore of the cylinder 16 is 5.300 inches. A typical alloy designation for the aluminum of the cylinder 16 (and of the other aluminum parts of the cutterhead 10) is T6-6061.

As shown, the outer peripheral surface of the cylinder 16 is composed of a plurality of radially outwardly divergent, longitudinally extending dovetail ribs 38 interspersed with a corresponding plurality of longitudinally extending grooves 40. A typical maximum outer diameter of the cylinder 16 (coincident with the radially outer back surfaces 42 of the ribs 38) is 7.235 inches. The grooves 40 preferably are flat-bottomed, the typical distance of the midpoint of each floor surface 44 from the longitudinal axis of the cylinder being 5.7558 inches. Eight ribs 38 are shown. More or fewer could be provided, with corresponding adjustments made to cylinder geometry. Each rib, along its back surface preferably occupies 45 degrees of the circumference of the cylinder. The flanks 46 of each rib are planar, but preferably are more steeply undercut than they would be if they were disposed wholly in longitudinal centerline planes of the cylinder. The extent of undercut of each such flank surface relative to a respective longitudinal centerline plane containing its radially outer edge, is 67.5 degrees. Stated another way, the two flanks of each rib are disposed in planes which intersect one another 1.5635 inches radially inwards along the respective planes from the radially outer corners of those flanks.

Access holes 48 are shown radially provided through respective ribs of the cylinder 16, intersecting the bore 36, in order to provide access for pressurizing and relieving the veins of the locking cylinder or cylinders 14. If the cylinder is sufficiently long that it is likely to be used with two locking sleeves, two such access holes are provided, e.g., two diametrically opposed ones near its end 32, and another pair near its end 34. However, if the cylinder is so short that it is likely to be used with only one locking sleeve, only one set of holes 48 needs to be provided.

The purpose of making the ribs 38 dovetailed is so the knife carriers and chip limiters (spacers), which are meant to be axially slid onto the ribs and then secured in place using set screws (to be described below), will not be radially flung off the cutterhead even if someone were to start rotating the arbor without having run-in those set screws.

Each hydraulic locking sleeve 14 (which might alternatively be called a "hydro-locking" sleeve or a "hydro-gripper" or "hydro-gripping" sleeve if those terms are not already trademarks denoting the products of others), preferably has three main parts, namely a cylindrical main body 50, a radially outer shell or ring 52, and an inner shell or ring 54. The body preferably is made of aluminum, and the shells 52, 54 are preferably made of 4041 steel alloy, 150 thousandths of an inch thick.

The outer shell 52 has a cylindrical, tubular portion 56, at one end of which is located a radially inwardly projecting annular flange 58.

Likewise, the inner shell 54 has a cylindrical, tubular portion 60, at one end of which is located a radially outwardly projecting annular flange 62. The shells 52 and 54 encase the main body 50 between them except at the end opposite from their flanges 58, 62. In place, the flanges 58, 62 are co-planar, with the radially inner edge of one radially neighboring the radially outer edge of the other. The radially inner surface of the tubular part 56 substantially matches the outer diameter of the main body 50, and the radially outer surface of the tubular part 60 substantially matches the inner diameter of the main body 50. The axial lengths of the tubular parts 56 and 60 are substantially equal to the axial length of the main body 50, so that the exposed end of the main body is substantially flush with the corresponding ends of the tubular parts 56 and 60.

Screws 64 securely mount the shells 52, 54 via their respective one end flanges is 58, 62 to the corresponding one end of the main body 50.

A radially outwardly opening groove, or vein, 66 is formed in the radially outer peripheral surface of the main body 50 near its one end. It is flanked on its axially opposite sides by circumferential O-ring grooves 68, in which O-rings 70 are received for sealing with the inner peripheral surface of the tubular part 56.

Likewise, a radially inwardly opening groove, or vein, 72, is formed in the radially inner peripheral surface of the main body 50 near its one end. It is flanked on its axially opposite sides by circumferential O-ring grooves 74, in which O-rings 76 are received for sealing with the outer peripheral surface of the tubular part 60.

Separate valved inlet fittings are provided at 78 and 80 for connection with a pressurizing device (e.g., a grease gun 82) for independently introducing hydraulic pressure medium (e.g., grease 84) into the respective veins via the respective internal channels 86, 88 for thereby elastically locally distorting the respective tubular parts 56 and 60 away from the respective surfaces of the main body 50, respectively, for thereby effectively increasing the outer diameter of the sleeve 14 for radially centralizing and locking it in the bore of a cylinder 16 and effectively decreasing the inner diameter of the sleeve 14 for radially centralizing and locking it onto the arbor 12.

Typically, the inlets 78, 80 are provided in the form of fittings which the present inventor believes to be known in the high pressure hydraulic grease systems as "zerk" fittings.

Similarly, for relieving pressure on each of the veins 66, 72, there is provided a respective normally closed, openable outlet valve 90, 92, which communicates with the respective veins through respective channels 94, 96. The respective shell tubular parts spring back upon depressurization of the respective veins, respectively permitting the sleeve 14 to be removed from the cylinder 16 and the sleeve 14 to be removed from the arbor 12.

The sleeves are so designed that there is from 2 up to less than 5 thousandths of an inch difference in their effective internal diameter, and a like difference in their outer diameter, between their being loose relative to the radially neighboring part upon depressurization of the respective vein by opening of the respective outlet valve (or prior to pressurization) and upon being pressurized for centralizing and securing the sleeve relative to the respective radially neighboring part. Typical grease is lithium based, and typical pressurization is 4500 to 6000 p.s.i. Grease can be injected using an utterly conventional high pressure grease gun, preferably one fitted with a pressure gauge for informing the user as grease is being injected about the extent of pressurization, and with a bleed valve for bleeding-off some grease in the outlet line of the gun following pressurization for facilitating disconnection of the grease gun from the respective inlet fitting of the hydraulic locking sleeve.

By making the sleeve 14 partly out of aluminum (e.g., the main body 50), a 3-inch long sleeve 14 having a 2.625-inch internal diameter can be made to weigh about 7.5 pounds, versus the about 14.25 pounds that it would weigh were its body 50 made of steel.

The carriers 18 (and limiters 20) are preferably made from round-backed aluminum extrusions, which are cut to length. Typical lengths are 1.5 inches, 2.0 inches, 2.5 inches and 3.0 inches. Typical outer diameters (considering disposition of the backs 98 when the carriers 18 are mounted on the cylinders) are 10.3 inches, 11 inches, 12 inches and 13 inches. (The backs 98 are cylindrically curved.) The limiters 20, at least where they are to be located in the same column as a knife-bearing carrier, need to have an outer diameter which is less than that of the respective knife or knives, e.g., 50 thousandths of an inch shorter, i.e., by an amount equal to the thickness of the maximally thick chip one might wish to be able to peel from the wood in one pass of the knife. The limiters 20 are structurally similar to the carriers, except that they do not have slots 22, and so do not mount knives 24, wedges 26 or keepers 28 and need not be restrained by threaded pins 30 against spreading.

The slots 22 in the 1.5-inch and 2.0-inch long carriers 18 preferably have a 45° shear angle, those in the 2.5-inch long carriers, a 40° shear angle, and those in the 3.0-inch long carriers, a 35° shear angle. All of the slots 22 preferably have a 10° cutting angle.

In use, the carriers 18 are selected for use with respective knives 24 such that a knife 24 can be shifted longitudinally of the slot 22 for height adjustment and/or cutting location purposes, without extending axially beyond either end of the respective carrier.

The underside of each carrier 18 (and each limiter 20) is provided with an axially extending, radially inwardly opening dovetail slot 100, shaped and sized to permit the carrier or limiter to be axially slid onto a respective rib 38, but incapable of being radially disengaged from the rib (to prevent the part from being flung off if not tightened).

Tightening is accomplished by running in brass-tipped set screws 102 which are accessible through threaded holes formed down through the carriers and limiters from the round backs. Preferably, there are two securement screws for all carriers and limiters. Play between the carriers (and limiters) and the cylinder 18 when the screws 102 are loose is sufficient to permit them to be easily axially slid into place. They jack up to the nominal back diameters stated above upon running-in of the screws 102. The profile of each slot 100 is similar to the profile of the respective rib 38.

The radially outwardly opening knife-mounting slot 22 in each carrier 18 preferably has the shape and relative size shown. It divides the radially outer portion of the respective carrier 18 into two lobes 104. Coaxially aligned threaded bores 106 in the lobes 104 in use threadedly receive a set screw, i.e., a threaded pin 30, which is, for instance, a steel pin having ⅜–16 threads.

Sandwiched in each slot (rotationally front to back) are shown a wedge 26, a knife 24 and a keeper 28. The wedge 26 has a perimetrically complete radially elongated slot 108 medially formed through it, front-to-rear; the knife 24 has a perimetrically incomplete slot 110 medially formed through it, front-to-rear, intersecting its lower edge; and the keeper 28 has a perimetrically complete slot 112 medially formed through it, front-to-rear. The pin 30 extends through the slots 108, 110 and 112.

The slot 22 is wider at the bottom than at the top; its preferred dimensions are as follows: The top is 0.7792 inch wide and the bottom is 1.000 inch wide.

The wedge likewise is wider at the bottom that at the top; its preferred dimensions are as follows: The top is 0.4047 inch wide and the bottom is 0.5811 inch wide.

The dimensions of the knife, the wedge and the keeper are such that when all of them are bottomed in the slot 22, the knife can be manually radially outwardly withdrawn, despite the pin 30 being in place, e.g., for sharpening and replacement.

However, the pin 30 prevents the wedge and keeper from being radially removed, so long as it is installed, and the relative masses and friction coefficients of the parts are such that, should someone begin spinning the arbor before having jacked the wedges 26 up to tightness (by running-in the brass-tipped screws 114) for the wedge-knife-keeper "sandwich", centrifugal force will tighten the "sandwich" before the knife can be flung out. The wedge and keeper preferably are made of aluminum, whereas the knife preferably is made of a usual tool steel used for knives of wood-turning lathes.

In fact, the main purpose of the pin 30 is to prevent the lobes 104 of the carrier from spreading apart at the slot 22 as the screws 114 are run in thus jacking-up the wedge 26 an tightening the wedge-knife-keeper "sandwich".

By preference, the (rotationally) backside of the knife 20 is provided with a radially extending series of longitudinal corrugations 116 which, in use, interdigitate with a similar series of corrugations 118 in the (rotationally) front face of the keeper 28, which aid in preventing flung-out of the knife should the wedge screws 114 have not been properly tightened before spinning the arbor 12. This interdigitation fixes the relative radial extension of the knife on the cutterhead 10. The knife can be provided with a lesser extension by loosening the "sandwich" and jumping the interdigitation by one corrugation inwards, or a greater extension by jumping the interdigitation by one corrugation outwards, and then retightening the screws 114.

By preference, a structural feature is provided between the keeper 28 and the carrier 18 for allowing vernier adjustment of the knife height by amounts less than or up to about the amount possible by jumping one corrugation. That feature is the provision of a rising-declining (i.e., tilted) interdigitated key and keyway arrangement 120, 122 on the forward face of the slot 22 and the rear face of the knife 24. (Which-has-which is subject to reversal.) The angle of tile of this feature preferably is 14°. Accordingly, shifting the keeper from end to end in the carrier, while maintaining the same corrugations interdigitated between the knife and keeper raises and lowers the knife and, thus, increases and decreases the cutting circle provided by use of the knife, by, e.g., 1/16 of an inch (which, in this example, is also the amount available if one corrugations is jumped while maintaining the axial position of the keeper relative to the carrier).

By preference, all of the rows and columns of the cutterhead are occupied either by a carrier with a knife-including "sandwich", or a limiter 20 which is nearly as radially extensive as any knives in the same column. The presence of the limiters provides "place holders" which radially, axially and rotationally fill what would otherwise be gaps in the external surface of the cutterhead. Two purposes are thereby served, respectively having to do with safety (or damage-control) and noise abatement. Filling the space makes sure that a snapping or splintering workpiece cannot cock into a deep depression in the cutterhead and then come hurdling out. It also means that, especially when unusually stressed due to such a breaking workpiece, the cutterhead carriers do not have their foremost rotational sides exposed to impact. The carriers and limiters can " lean" on one another rotationally of the cutterhead and thus "keep a low profile" that minimizes chances that a breaking workpiece will rip one of them loose from the cutterhead. Secondly, the gap-filling results in less air turbulence, and, thus, a lower decibel level of noise needing to be abated for sake of worker safety and comfort.

The element-to-element spacing (rotationally of the cutterhead) when the carriers and limiters are all secured in place preferably is about 50 thousandths of an inch.

Thus, there is provided a cutterhead in which two independent hydraulically pressurized veins are used for mounting the cylinder to the sleeve or sleeves, and the latter to the arbor, the carriers are dovetailed to the cylinder in a fail-safe manner, the thick-at-the-bottom wedge (and corrugations and pin) prevent knives from being flung out even when not properly tightened, operation is quieter due to use of limiters, strength comes from engineering rather than from mass, cutting circles are adjustable and can be maintained despite sharpening of knives, knives are easily removed for sharpening and replaced, and many features (such as the threaded pins) serve multiple purposes, such as preventing carrier spread and aiding in "sandwich" retention.

It should now be apparent that the wood lathe tooling as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A hydraulic locking sleeve for releasably locking a knife carrier cylinder of a cutterhead onto an arbor of a wood-turning lathe, comprising:

a tubular main body having two axially opposite ends, a radially inner peripheral surface and a radially outer peripheral surface;

a first shell made of elastic hard metal closely encasing at least a circumferentially continuous portion of said radially outer peripheral surface of said main body;

a second shell made of elastic hard metal closely encasing at least a circumferentially continuous portion of said radially inner peripheral surface of said main body;

first fastening means securing said first shell to said main body while permitting limited radially outward expansion of said portion of said first shell;

second fastening means securing said second shell to said main body while permitting limited radially inward expansion of said portion of said second shell;

a circumferentially extending first channel or vein formed in said outer peripheral surface of said main body, radially underlying said portion of said first shell;

a circumferentially extending second channel or vein formed in said inner peripheral surface of said main body, radially overlying said portion of said second shell;

circumferential seals flanking each of said channels or veins and effectively sealing between respective of said peripheral surfaces and respective of said portions;

a separate valved inlet through said sleeve into each of said channels or veins from externally of said sleeve;

a separate valved outlet through said sleeve from each of said channels or veins to externally of said sleeve;

each of said valved inlets being openable when supplied with more highly pressurized pressurization fluid than contained within the respective channel or vein;

each of said valved outlets being normally closed but selectively openable for releasing pressure contained with the respective channel or vein;

each channel or vein being sufficiently pressurizable as to elastically distend the respective portion of the respective shell for independently correspondingly effectively increasing the sleeve in external diameter and decreasing the sleeve in internal diameter.

2. The locking sleeve of claim 1, wherein:

said main body is made of aluminum and said sleeves are made of steel.

3. The locking sleeve of claim 1, further including:

pressurized grease filling said channels or veins and thereby elastically distending said portions of said shells.

4. The locking sleeve of claim 1, wherein:

said first and second fastening means are constituted by respective annular flanges provided at respective one ends of respective tubular elements of said shells on which tubular elements said portions are provided;

said annular flanges being fastened by respective fasteners to one end of said main body.

5. The locking sleeve of claim 4, wherein:

said fasteners are screws.

6. The locking sleeve of claim 1, wherein:

said circumferential seals are O-rings seated in respective circumferential grooves.

7. A cutterhead assembly, comprising:

a tubular cylinder having two axially opposite ends, a longitudinal bore and a radially outer peripheral surface;

means for mounting said cylinder on a rotatable arbor for rotation coaxially with the arbor; and means associated with said outer peripheral surface of said cylinder for removably mounting at least one knife on said cylinder for rotation therewith;

said outer peripheral surface of said cylinder comprising a plurality of equiangularly spaced, longitudinally extending, radially outwardly projecting ribs each of which is dovetailed in transverse cross-sectional shape so as to increase radially outwardly in transverse dimension;

said associated means comprising at least one circumferentially segmental carrier having a dovetailed slot formed in an underside thereof permitting axial sliding of that carrier onto a respective said rib, but preventing radial flinging of that carrier from said rib;

jack screw means operable between each said carrier and said cylinder for maximally raising and thereby tightening the respective carrier on said cylinder; and an assembly carried by each said carrier for removably mounting a knife thereto so as to project radially outwardly therebeyond.

8. The cutterhead of claim 7, wherein:

said means for mounting said cylinder on a rotatable arbor for rotation coaxially with the arbor comprises:
a tubular main body having two axially opposite ends, a radially inner peripheral surface and a radially outer peripheral surface;
a first shell made of elastic hard metal closely encasing at least a circumferentially continuous portion of said radially outer peripheral surface of said main body;
a second shell made of elastic hard metal closely encasing at least a circumferentially continuous portion of said radially inner peripheral surface of said main body;
first fastening means securing said first shell to said main body while permitting limited radially outward expansion of said portion of said first shell;
second fastening means securing said second shell to said main body while permitting limited radially inward expansion of said portion of said second shell;
a circumferentially extending first channel or vein formed in said outer peripheral surface of said main body, radially underlying said portion of said first shell;
a circumferentially extending second channel or vein formed in said inner peripheral surface of said main body, radially overlying said portion of said second shell;
circumferential seals flanking each of said channels or veins and effectively sealing between respective of said peripheral surfaces and respective of said portions;
a separate valved inlet through said sleeve into each of said channels or veins from externally of said sleeve;
a separate valved outlet through said sleeve from each of said channels or veins to externally of said sleeve;
each of said valved inlets being openable when supplied with more highly pressurized pressurization fluid than contained within the respective channel or vein;
each of said valved outlets being normally closed but selectively openable for releasing pressure contained with the respective channel or vein;
each channel or vein being sufficiently pressurizable as to elastically distend the respective portion of the respective shell for independently correspondingly effectively increasing the sleeve in external diameter and decreasing the sleeve in internal diameter.

9. The cutterhead of claim 7, wherein:

each said carrier includes a radially outwardly opening slot formed therein so as to divide a radially outer portion of the carrier into two lobes, one leading and another trailing said radially outwardly opening slot;

said radially outwardly opening slot diminishing in width depthwise thereof;

said radially outwardly opening slot having a rotationally leading flank and a rotationally trailing flank;

a pin intersecting said radially outwardly opening slot and secured to both lobes of said radially outer portion of said carrier;

said assembly including a wedge located next to said leading flank and a keeper located next to said trailing flank;

said pin extending through a radially elongated perimetrically continuous slot through said wedge;

said pin extending through a perimetrically continuous slot through said keeper said wedge radially outwardly decreasing in dimension rotationally of said cylinder;

said wedge and keeper being sized to radially removably loosely receive a knife sandwiched between them when said wedge is disposed its maximally lowermost in said radially outwardly opening slot, but to grip so securely between them such a knife when said wedge is elevated to above its maximally lowermost in said radially outwardly opening slot.

10. The cutterhead of claim 9, wherein:

said assembly further includes jack screw means on said wedge, engageable with said carrier for forceably elevating said wedge to above its maximally lowermost.

11. The cutterhead of claim 10, wherein:

said means for mounting said cylinder on a rotatable arbor for rotation coaxially with the arbor comprises:
a tubular main body having two axially opposite ends, a radially inner peripheral surface and a radially outer peripheral surface;
a first shell made of elastic hard metal closely encasing at least a circumferentially continuous portion of said radially outer peripheral surface of said main body;
a second shell made of elastic hard metal closely encasing at least a circumferentially continuous portion of said radially inner peripheral surface of said main body;
first fastening means securing said first shell to said main body while permitting limited radially outward expansion of said portion of said first shell;
second fastening means securing said second shell to said main body while permitting limited radially inward expansion of said portion of said second shell;
a circumferentially extending first channel or vein formed in said outer peripheral surface of said main body, radially underlying said portion of said first shell;
a circumferentially extending second channel or vein formed in said inner peripheral surface of said main body, radially overlying said portion of said second shell;
circumferential seals flanking each of said channels or veins and effectively sealing between respective of said peripheral surfaces and respective of said portions;
a separate valved inlet through said sleeve into each of said channels or veins from externally of said sleeve;
a separate valved outlet through said sleeve from each of said channels or veins to externally of said sleeve;

each of said valved inlets being openable when supplied with more highly pressurized pressurization fluid than contained within the respective channel or vein;

each of said valved outlets being normally closed but selectively openable for releasing pressure contained with the respective channel or vein;

each channel or vein being sufficiently pressurizable as to elastically distend the respective portion of the respective shell for independently correspondingly effectively increasing the sleeve in external diameter and decreasing the sleeve in internal diameter.

12. The cutterhead of claim 11, further including:

a knife sandwiched between each said wedge and each said keeper.

13. The cutterhead of claim 12, wherein:

each said knife has a radially extending series of longitudinal corrugations formed in a rotationally trailing face thereof and adjustably, selectively interdigitated with respective ones of a radially extruding series of longitudinal corrugations formed in a rotationally leading face of the respective said keeper.

14. The cutterhead of claim 13, further including interdigitated radially slanting longitudinally extending key and keyway means formed on a rotationally trailing face of each said keeper and the rotationally trailing flank of each said radially outwardly opening slot, whereby knife height can be adjusted without jumping corrugations, by sliding a respective keeper longitudinally in a respective radially outwardly opening slot.

15. The cutterhead of claim 7, further including:

a knife sandwiched between each said wedge and each said keeper.

16. The cutterhead of claim 15, wherein:

each said knife has a radially extending series of longitudinal corrugations formed in a rotationally trailing face thereof and adjustably, selectively interdigitated with respective ones of a radially extruding series of longitudinal corrugations formed in a rotationally leading face of the respective said keeper.

17. The cutterhead of claim 16, further including interdigitated radially slanting longitudinally extending key and keyway means formed on a rotationally trailing face of each said keeper and the rotationally trailing flank of each said radially outwardly opening slot, whereby knife height can be adjusted without jumping corrugations, by sliding a respective keeper longitudinally in a respective radially outwardly opening slot.

18. The cutterhead of claim 7, wherein:

a plurality of said carriers are associated with said cylinder in a plurality of longitudinal rows on same ones of said ribs and in a plurality of circumferential columns on different ones of said ribs.

19. The cutterhead of claim 18, further comprising:

a plurality of chip-limiting spaces substantially filling gaps between at least one of axially and rotationally neighboring ones of said carriers.

20. The cutterhead of claim 11, wherein:

a plurality of said carriers are associated with said cylinder in a plurality of longitudinal rows on same ones of said ribs and in a plurality of circumferential columns on different ones of said ribs.

21. The cutterhead of claim 20, further comprising:

a plurality of chip-limiting spaces substantially filling gaps between at least one of axially and rotationally neighboring ones of said carriers.

22. The cutterhead of claim 13, wherein:

a plurality of said carriers are associated with said cylinder in a plurality of longitudinal rows on same ones of said ribs and in a plurality of circumferential columns on different ones of said ribs.

23. The cutterhead of claim 22, further comprising:

a plurality of chip-limiting spaces substantially filling gaps between at least one of axially and rotationally neighboring ones of said carriers.

* * * * *